(12) United States Patent
Kurth et al.

(10) Patent No.: US 8,210,384 B2
(45) Date of Patent: Jul. 3, 2012

(54) CLOSURE CAP

(75) Inventors: Martin Kurth, Weil am Rhein Ötlingen (DE); Eric Bügner, Buchenbach (DE)

(73) Assignee: A. Raymond & Cie, Grenoble (FR)

( * ) Notice: Subject to any disclaimer, the term of this patent is extended or adjusted under 35 U.S.C. 154(b) by 1167 days.

(21) Appl. No.: 10/565,607

(22) PCT Filed: Jun. 23, 2004

(86) PCT No.: PCT/EP2004/006767
§ 371 (c)(1),
(2), (4) Date: Oct. 27, 2006

(87) PCT Pub. No.: WO2005/018998
PCT Pub. Date: Mar. 3, 2005

(65) Prior Publication Data
US 2007/0108216 A1  May 17, 2007

(30) Foreign Application Priority Data

Jul. 24, 2003  (DE) .................................. 103 33 578

(51) Int. Cl.
*B65D 41/00* (2006.01)
*B65D 39/00* (2006.01)
*B65D 41/16* (2006.01)
*B65D 43/00* (2006.01)
*B65D 43/04* (2006.01)

(52) U.S. Cl. .................. 220/359.4; 220/359.1; 220/789; 220/798; 220/799; 220/800; 215/232; 215/320; 215/321; 215/355

(58) Field of Classification Search ............... 220/315, 220/324, 359.1, 359.4, 789, 795, 799, 800, 220/801; 215/232, 320, 321, 355, 356, 364
See application file for complete search history.

(56) References Cited

U.S. PATENT DOCUMENTS

| | | | |
|---|---|---|---|
| 3,851,794 A | | 12/1974 | Hehl |
| 4,290,536 A | * | 9/1981 | Morel ........................... 220/789 |
| 4,560,083 A | * | 12/1985 | Danico .......................... 220/786 |
| 4,588,105 A | * | 5/1986 | Schmitz et al. ................ 220/787 |
| 5,267,667 A | * | 12/1993 | Cozzani ........................ 220/787 |
| 5,702,133 A | * | 12/1997 | Pavur et al. ...................... 292/80 |
| 6,464,101 B1 | * | 10/2002 | Siragusa et al. .............. 220/795 |

* cited by examiner

*Primary Examiner* — Anthony Stashick
*Assistant Examiner* — Madison L Wright
(74) *Attorney, Agent, or Firm* — Tarolli, Sundheim, Covell & Tummino LLP

(57) ABSTRACT

Disclosed is a closure cap (1) comprising a exterior marginal web (5), a shielding section (4) that protrudes past the marginal web (5), and a hot-melt adhesive (11) which is arranged in the area of the shielding section (4) and is deformable in a plastic manner when heated above a softening temperature. A number of gripping abutment elements (7) are embodied on the marginal web (5) while a joint zone (3) having a reduced flexural rigidity is configured between the marginal web (5) and the shielding section (4). The distance between the abutment elements (7) and the bottom side of the hot-melt adhesive, which faces the marginal web (5), is smaller than the thickness of the material of a basic part (13) in the area of the opening such that an initial tension is created in the joint zone (3) when the closure cap (1) is inserted into the opening, resulting in a simple self-acting closing process after heating the hot-melt adhesive (11).

11 Claims, 5 Drawing Sheets

CLOSURE CAP

Figure 1:
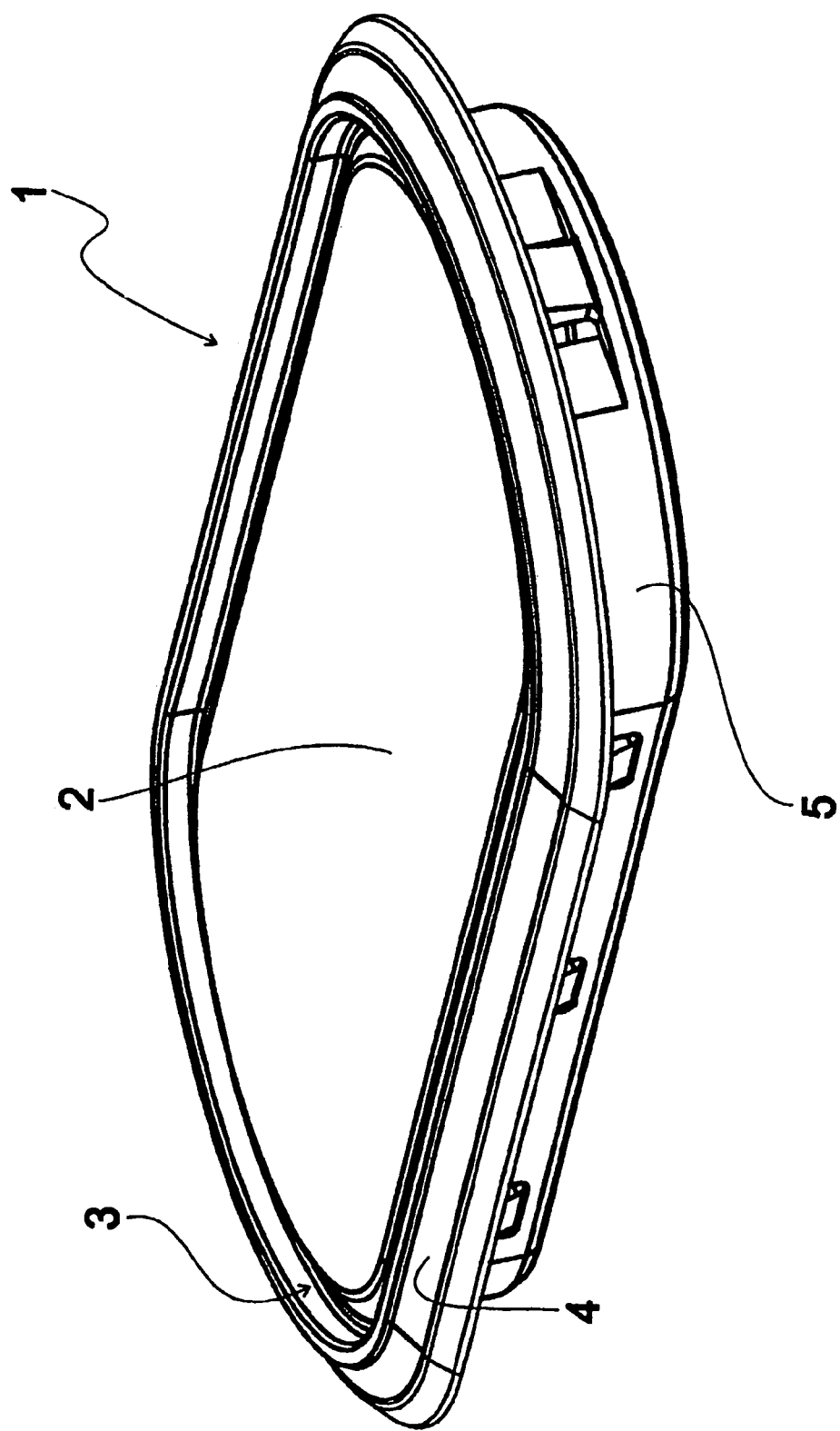

The invention relates to a closure cap for sealing an opening in a base part.

Known from the practice are closure caps that are made with an exterior marginal web that can be inserted into an opening made in a base part. In addition, in these closure caps a shielding section which protrudes past the marginal web is also present. In conjunction with that, a hot-melt adhesive that is deformable in a plastic manner when heated above a softening temperature is arranged between the marginal web and the shielding section in order to seal the opening made in, for example, an automobile body panel as the base part, in a gas-tight and noise-reducing way after heating the hot-melt adhesive at least to the softening temperature and the gravity-induced dropping or pressing-on of the closure cap.

What is disadvantageous about the previously known closure caps, however, is the relatively low process reliability with the gravity induced dropping or the requirement for manual interventions for pressing on.

The invention is based on the problem of suggesting a closure cap which, in a process that is free of additional interventions other than the arranging of the closure cap, leads to a reliable, self-acting sealing of an opening after heating the hot-melt adhesive.

According to the invention, this problem is solved with a closure cap for sealing an opening in a base part, with an exterior marginal web that can be inserted into the opening, with a shielding section that protrudes past the marginal web, and with a hot-melt adhesive that is arranged in the area of the shielding section and is deformable in a plastic manner when heated above a softening temperature, whereby configured on the marginal web are a number of abutment elements that grip the base part when the closure cap is inserted into the opening, whereby a joint zone having a flexural rigidity that is reduced versus that of the shielding section is configured between the marginal web and the shielding section, and whereby the distance between the gripping contact areas of the abutment elements and the bottom side of the hot-melt adhesive, which faces the marginal web, is smaller than the thickness of the base part in the marginal area of the opening such that an initial tension is created in the joint zone when the closure cap is inserted into the opening.

As a result of the fact that an initial tension is created in the joint zone by the dimensioning of the distance between the hot-melt adhesive and the contact areas, said dimensioning being adapted to the thickness of the base part in the marginal area of the opening, after heating the hot-melt adhesive to at least the softening temperature with at least partial reduction of this initial tension, the shielding section moves in the direction of the base part and thereby presses the hot-melt adhesive onto the base part while displacing the volume that is free of the hot-melt adhesive. Achieved in this way is a self-acting, gas-tight and noise-reducing sealing of the opening that can be performed with great process reliability.

In a practical further development that is easy to execute in terms of manufacturing technology, the joint zone exhibits a groove section with a thickness of material that is reduced from the adjoining interior areas. In conjunction with that, the groove section is advantageously open in the direction pointing away from the marginal web in order to avoid material-consuming filling.

In order to achieve a good connection between the shielding section and the hot-melt adhesive in the case of another practical development, a groove-like transition zone that is filled with hot-melt adhesive and is open in the direction of the exterior margin of the shielding action is present between the shielding section and the joint zone.

In one further development, the abutment elements advantageously exhibit snap-in catches that can move transversely to the marginal web and are connected with the marginal web. This configuration is especially well-suited for sealing openings with thicknesses of material that are essentially the same in the marginal area.

In another further development, the abutment elements have a number of sawtooth-like projections configured on the marginal web. This configuration is especially well-suited for sealing openings with different thicknesses of material in the marginal area.

Additional practical developments and advantages of the invention emerge from the following description of an embodiment, including references to the figures of the drawing. The following are shown:

FIG. 1 a perspective view from above of an embodiment of a closure cap according to the invention, with a groove section that is open in the direction pointing away from a marginal web and with a shielding section that protrudes on the exterior past the marginal web, FIG. 2 a perspective view from below of the closure cap according to FIG. 1, with movable abutment elements configured on the marginal web, FIG. 3 the embodiment according to FIGS. 1 and 2 in a section through the marginal web and the shielding section in the area of an abutment element, with a hot-melt adhesive applied in the area of the shielding section, FIG. 4 the closure cap according to FIGS. 1 through 3 in a representation corresponding to FIG. 3, after insertion into an opening that is to be sealed and before heating the hot-melt adhesive, and FIG. 5 the closure cap according to FIGS. 1 through 4 in a representation corresponding to FIG. 4, after heating the hot-melt adhesive.

FIG. 1 shows a perspective view from above of an embodiment of a closure cap 1 according to the invention. The closure cap 1 is used for sealing an opening in a base part that is configured, for example, as a body panel for a motor vehicle. The closure cap 1 exhibits a flattened, relatively extensive closure section 2 which is adjoined by a circumferential groove section 3 on the margin side in order to form a joint zone. In addition, the closure cap 1 is configured with a shielding section 4: that continues from the groove section 3 on the exterior and forms the outer margin of the closure cap 1.

In the transition zone between the closure section 2, the groove section 3 and the shielding section 4, the closure cap 1 exhibits a circumferential marginal web 5, which points in the direction away from the closure section 2 and which, with proper dimensioning of the closure cap 1 adapted to the circumference of the opening that is to be sealed, can be inserted into the opening.

Figure 2:
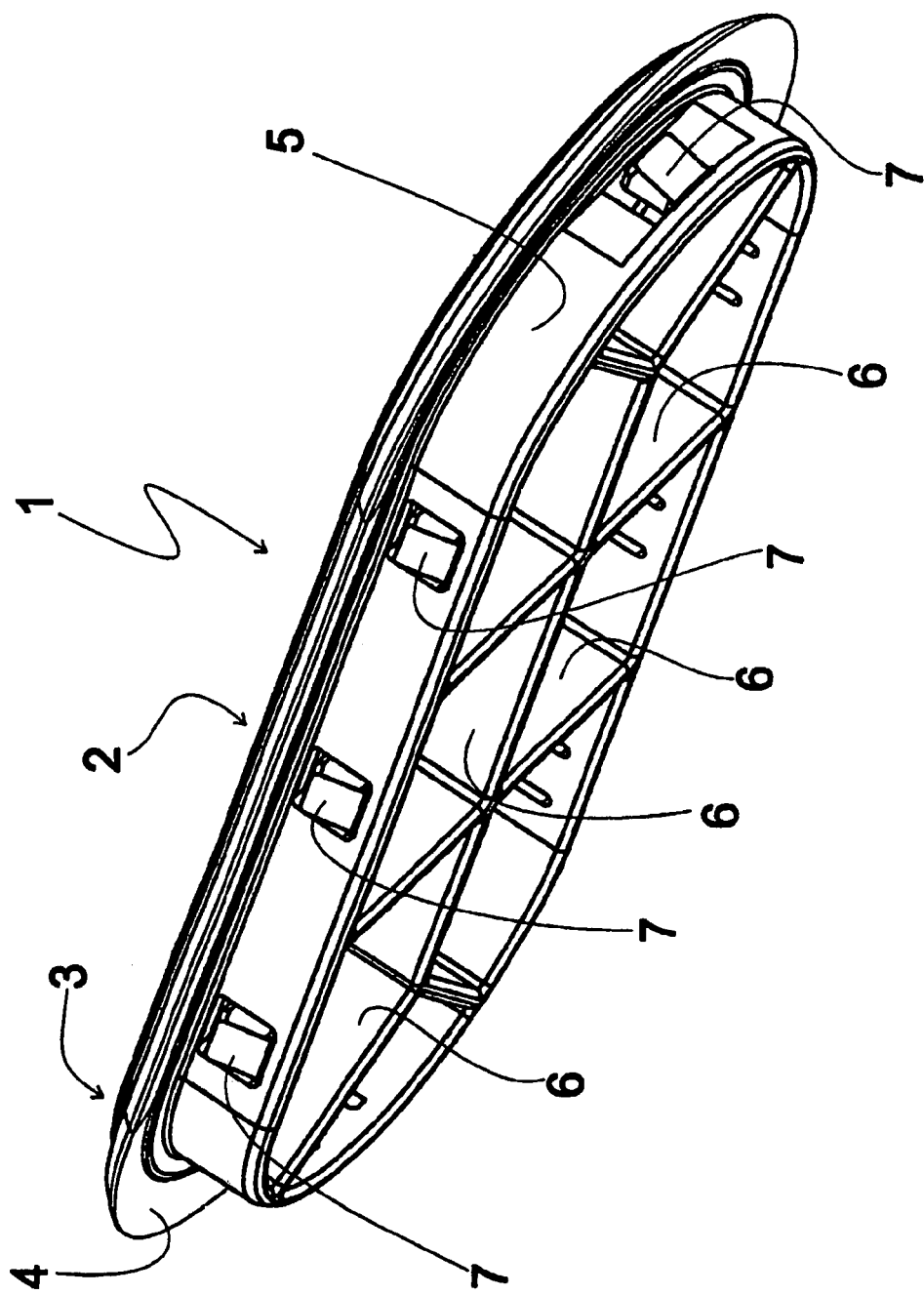

FIG. 2 shows a perspective view from below of the closure cap 1 according to FIG. 1. It can be seen from the representation according to FIG. 2 that a number of stiffening ribs 6 are configured between the circumferential marginal web 5, which impart to the closure cap 1 relatively high stiffness, especially in the area of the closure section 2. In addition, it can clearly be seen in FIG. 2 that a number of abutment elements 7 are configured on the marginal web 5 around its circumference.

Figure 3:
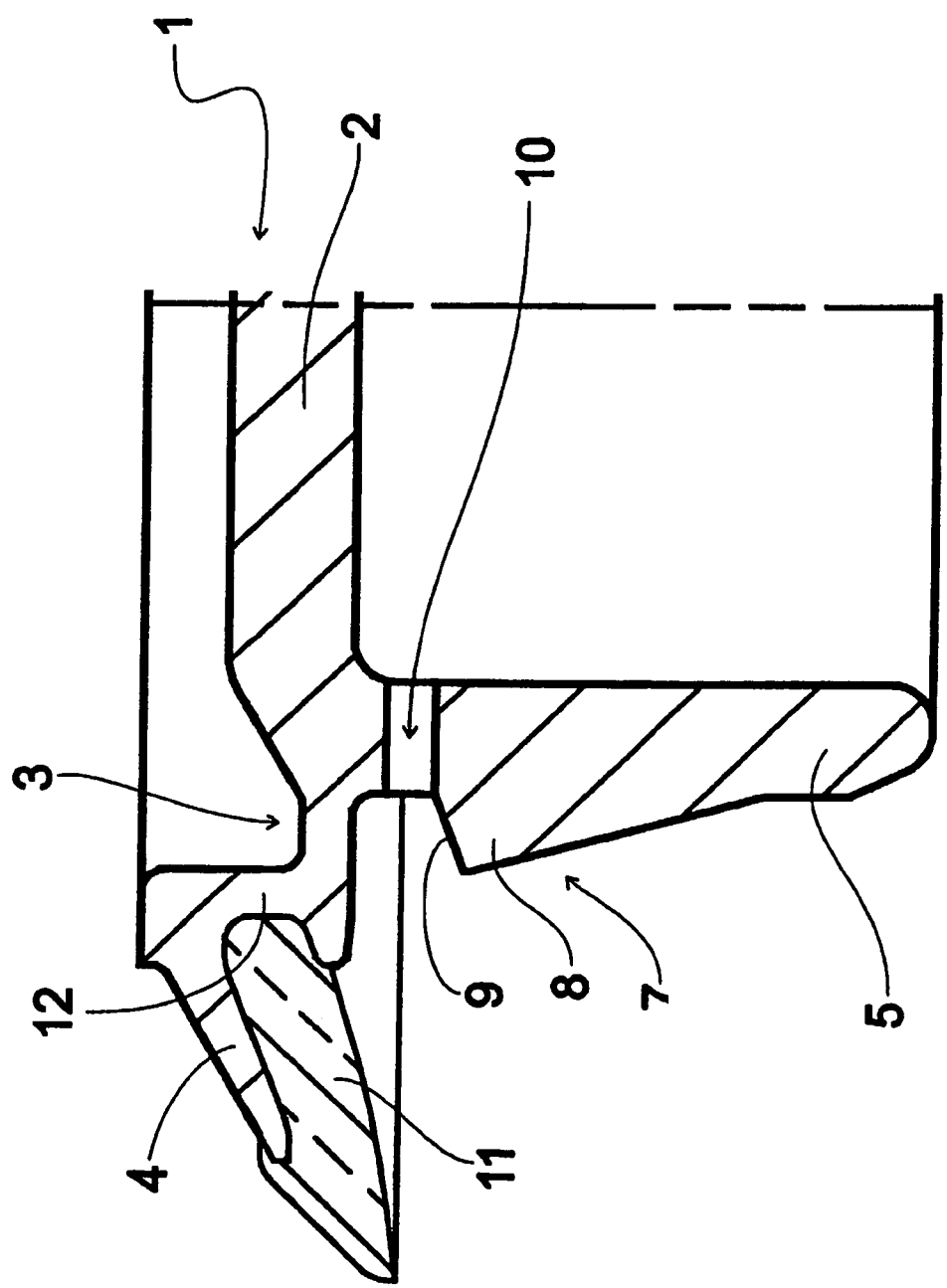

FIG. 3 shows the closure cap 1 according to FIGS. 1 and 2 in a section through the marginal web 5 and the shielding section 4 in the area of an abutment element 7.

As can be gathered from FIG. 3, the abutment elements 7 exhibit snap-in latches 8 which protrude with a contact area 9 past the marginal web 5, and which can be moved transversely to the marginal web. 5 due to provision of a recess 10 made on three sides. It can also be seen from FIG. 3 that the shielding section is angled in the direction towards the marginal web 5.

According to FIG. 3, the closure cap 1 is configured with a hot-melt adhesive 11, which lies against the side of the shielding section 4 facing the marginal web 5 and adheres to it. The hot-melt adhesive 11 is essentially solid at room temperature or a slightly higher temperature, while it becomes deformable in a plastic manner following heating to a softening temperature that is typically about 100 degrees Celsius to about 150 degrees Celsius or above. In the case of the closure cap 1 according to the illustrated embodiment, the hot-melt adhesive 11 engages into a groove-like transition zone 12 and protrudes past the exterior margin of the shielding section 4. The groove-like transition zone 12 is arranged between the shielding section 4 and the groove section 3 and is open towards the outside. In conjunction with that, a stress-relief distance exists between the protruding portion of the hot-melt adhesive 11 and the contact areas 9 of the abutment elements 7 in the longitudinal direction of the marginal web 5.

As can also be gathered from the representation according to FIG. 3, due to the groove section 3 that is configured between the closure section 2 and the shielding section 4, a thickness of material is present that is reduced versus the thicknesses of material in the transition zone between the closure section 2 and the marginal web 5, which, together with the transition section 12 that is aligned approximately parallel to the marginal web 5, leads to a reduced flexural rigidity of the joint zone.

Figure 4:
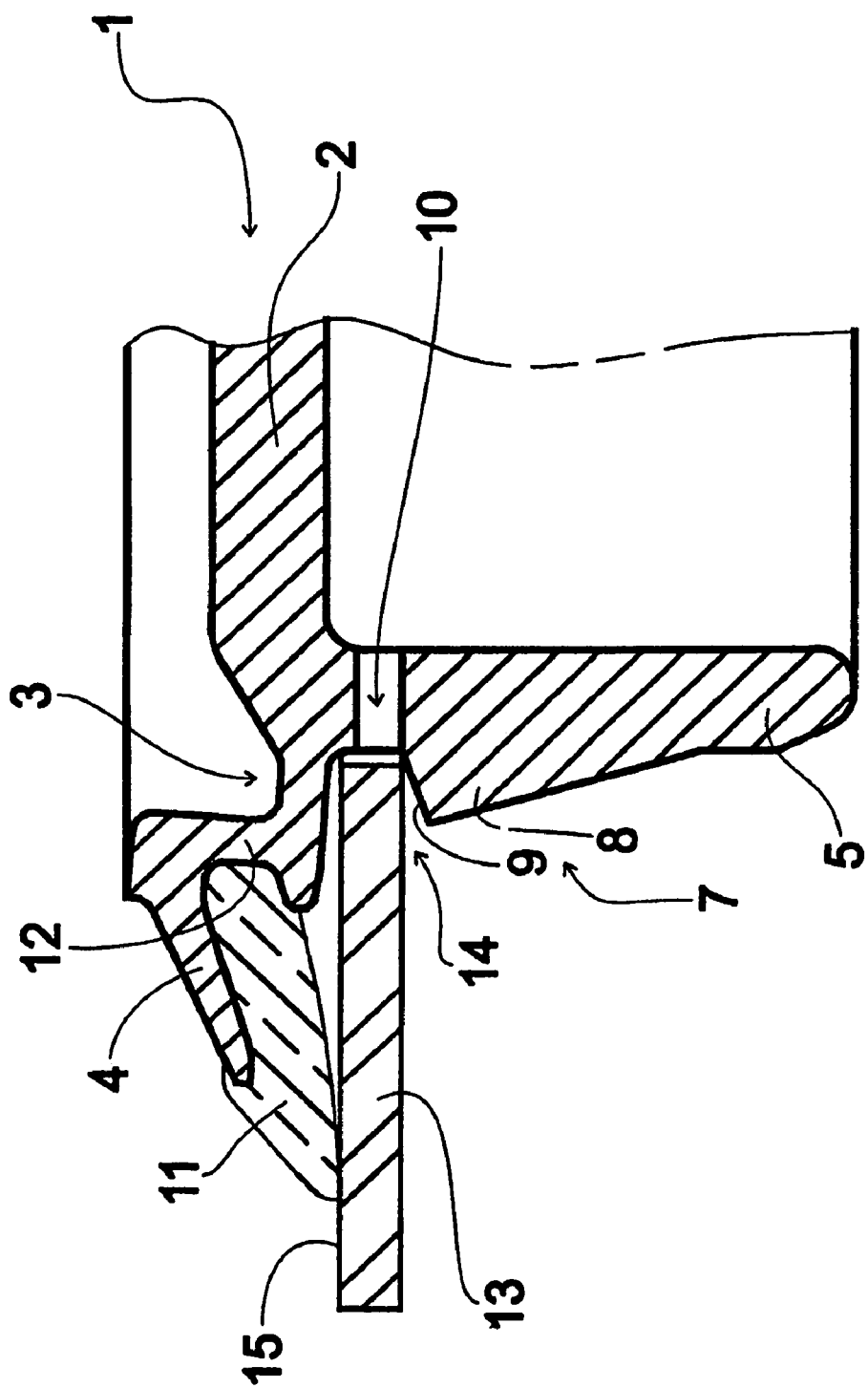

FIG. 4 shows the closure cap 1 according to FIGS. 1 through 3 in a representation corresponding to FIG. 3, after insertion into an opening that is to be sealed in a base part 13, while it is at room temperature before heating the hot-melt adhesive 11, whereby with regard to the base part 13, only one side of the marginal area 14 that is adjacent to the opening to be sealed is shown. In conjunction with that, the thickness of the marginal area 14 is greater than the stress-relief distance. As can be gathered from the representation according to FIG. 4, the portion of the hot-melt adhesive 11 that protrudes past the shielding section 4 lies against the contact side 15 of the base part 13, and the contact areas 9 of the abutment elements 7 grip the marginal area 14 of the base part 13. In conjunction with that, an initial tension is created in the groove section 3 in particular, but to a certain extent in the transitional zone 12 as well, since, because the thickness of material in the marginal area 14 is greater than the stress-relief distance, the shielding section 4 deflects in the direction pointing away from the marginal web 5.

Figure 5:
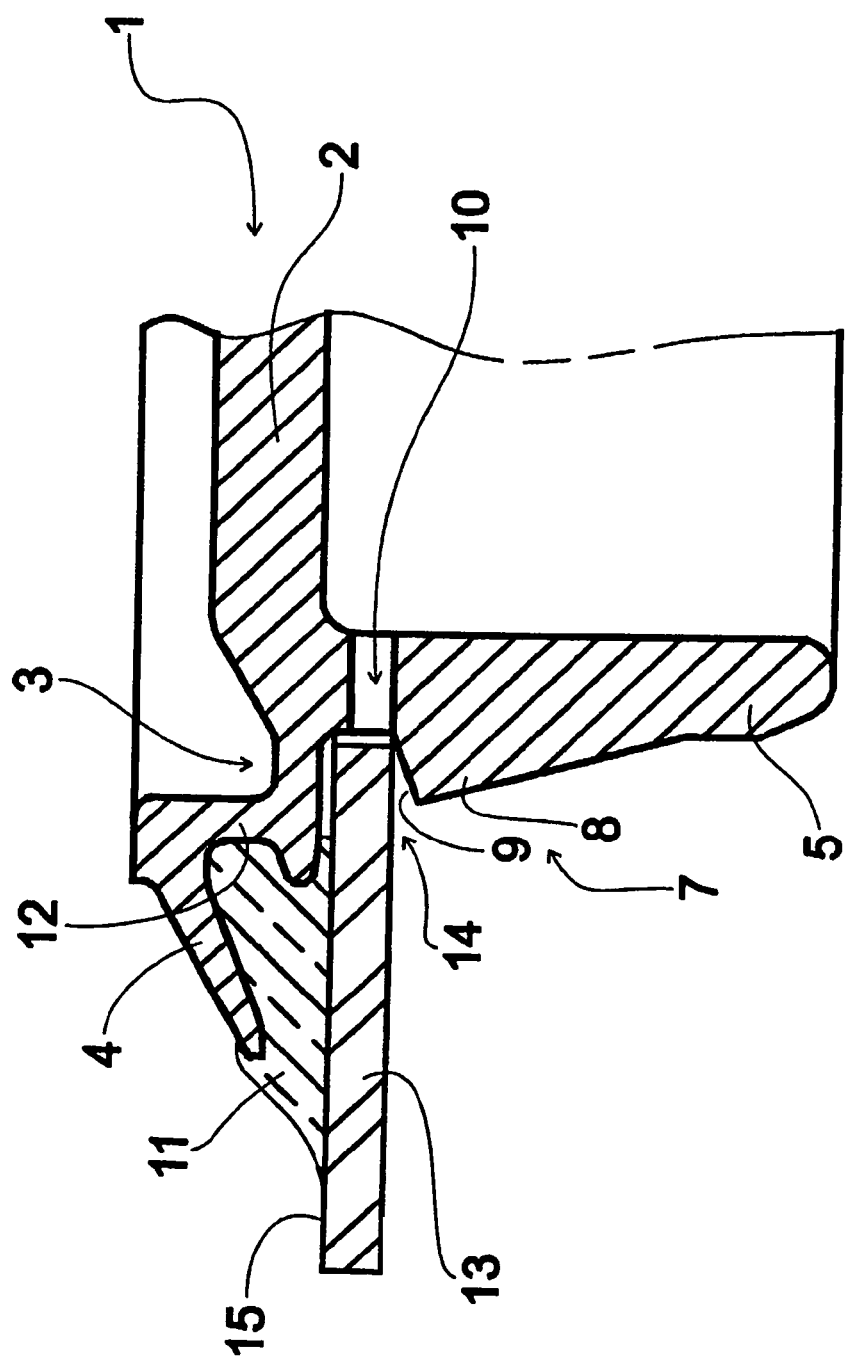

FIG. 5 shows the closure cap 1 according to FIGS. 1 through 4 in a representation corresponding to FIG. 4, after heating the hot-melt adhesive 11 to a process temperature that is far higher than room temperature and that at least corresponds to the softening temperature of the hot-melt adhesive 11. As can be gathered from FIG. 5, when compared with the arrangement according to FIG. 4, due to the plastic deformability of the hot-melt adhesive 11 and the reduction of the initial stress associated with that, especially in the groove section 3 of the shielding section 4, in a self-acting manner and, in conjunction with that, independently of the installation position, the closure cap 1 has drawn near the contact side 15 of the base part 13, and the hot-melt adhesive 11 has filled the volume between the side of the shielding section 4 facing the marginal web 5 and the contact side 15, whereby through the setting of the process temperature and the process time, a portion of the material of the hot-melt adhesive 11 has crept forward in the direction of the marginal web 5. As a result, an operationally reliable and, in terms of process-control engineering, relatively easy to handle sealing of the opening in question is achieved in a way that is free of additional handling measures other than the insertion of the closure cap 1 into the opening.

The invention claimed is:

1. Closure cap for sealing an opening in a base part (13), with a closure section (2) and an exterior circumferential marginal web (5) that extends from the closure section (2) and that can be inserted into the opening, with a shielding section (4) that extends from the closure section (2) and protrudes past the marginal web (5), and with a hot-melt adhesive (11) that is arranged adjacent to the shielding section (4) and is deformable in a plastic manner when heated above a softening temperature, whereby configured on the marginal web (5) is an abutment arrangement (7) that grips the base part (13) when the closure cap (1) is inserted into the opening, whereby a joint zone having a flexural rigidity that is reduced versus that of the shielding section (4) is configured between the marginal web (5) and the shielding section (4), and whereby a distance between gripping contact areas (9) of the abutment arrangement (7) and a bottom side of the hot-melt adhesive (11), which faces the marginal web (5), is smaller than a thickness of the base part (13) in a marginal area (14) of the opening such that an initial tension is created in the joint zone when the closure cap (1) is inserted into the opening, wherein present between the shielding section (4) and the joint zone is a groove-like transition zone (12), which is filled with hot-melt adhesive (11) and which is open towards an exterior margin of the shielding section (4).

2. Closure cap according to claim 1, wherein the joint zone between the shielding section (4) and the marginal web (5) exhibits a groove section (3), a thickness of material of which is reduced versus adjacent interior areas.

3. Closure cap according to claim 2, wherein the groove section (3) is open in a direction pointing away from the marginal web (5).

4. Closure cap according to claim 1, wherein the abutment arrangement (7) exhibits snap-in catches (8) that can move transversely to the marginal web (5) and are connected with the marginal web (5).

5. Closure cap according to claim 1, wherein the abutment arrangement (7) has a number of sawtooth-like projections configured on the marginal web (5).

6. Closure cap according to claim 4 further including at least one recess (10) that extends entirely through the marginal web (5) and allows the snap-in catches (8) to move transversely to the marginal web (5).

7. Closure cap according to claim 2, wherein the joint zone (3) terminates at a position that is spaced from the base part (13) in a longitudinal direction a distance that is smaller than the distance between the shielding section (4) and the base part (13) in the longitudinal direction.

8. Closure cap according to claim 1, wherein the closure section (2) includes a groove section (3) adjacent to the shielding section (4).

9. Closure cap according to claim 1, wherein the closure section (2) includes a groove section (3) that is spaced from the marginal web (5).

10. Closure cap according to claim 1, wherein when the closure cap (1) is inserted into the opening the closure section (2) and shielding section (4) are positioned on a first side of the opening and the marginal web (5) is positioned on a second side of the opening opposite the first side.

11. Closure cap according to claim 1, wherein the closure section (2) is positioned between the shielding section (4) and the marginal web (5).

* * * * *